J. HEGEDUS.
FIRE ESCAPE.
APPLICATION FILED OCT. 4, 1907.

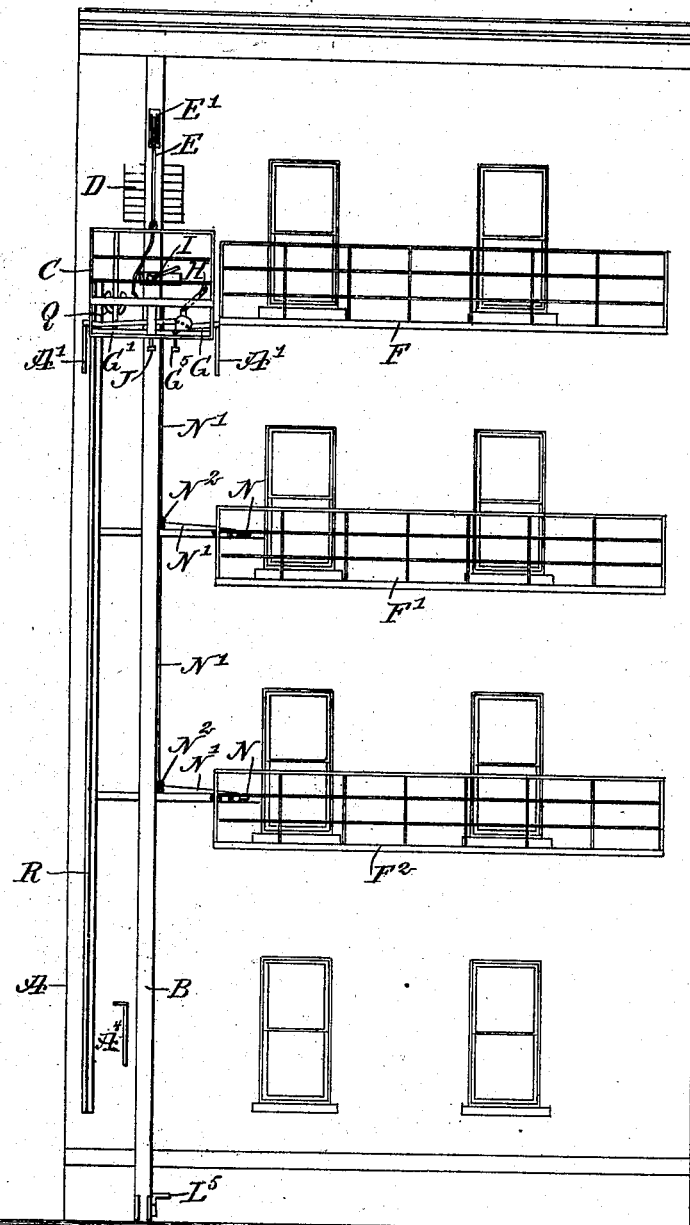

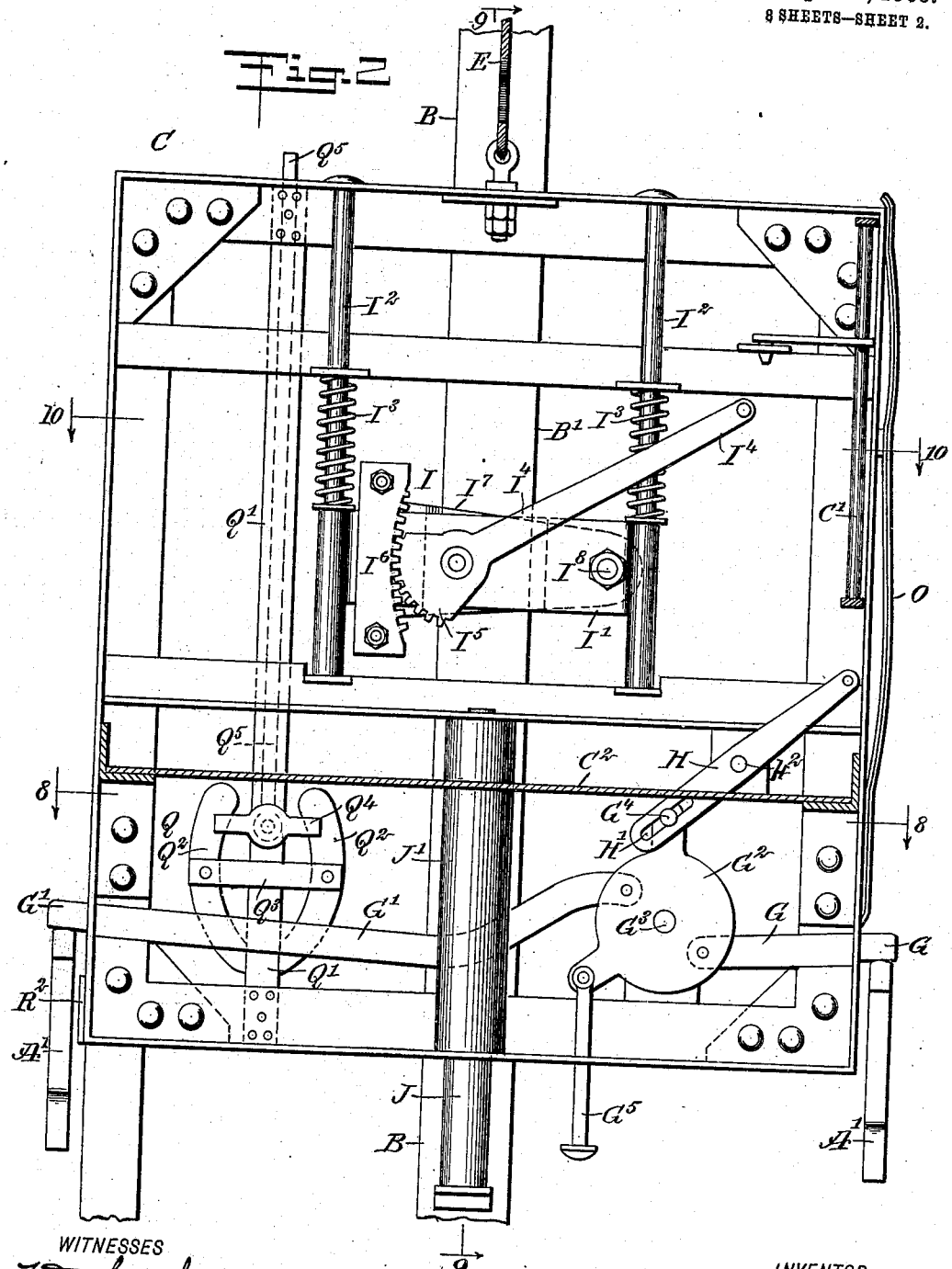

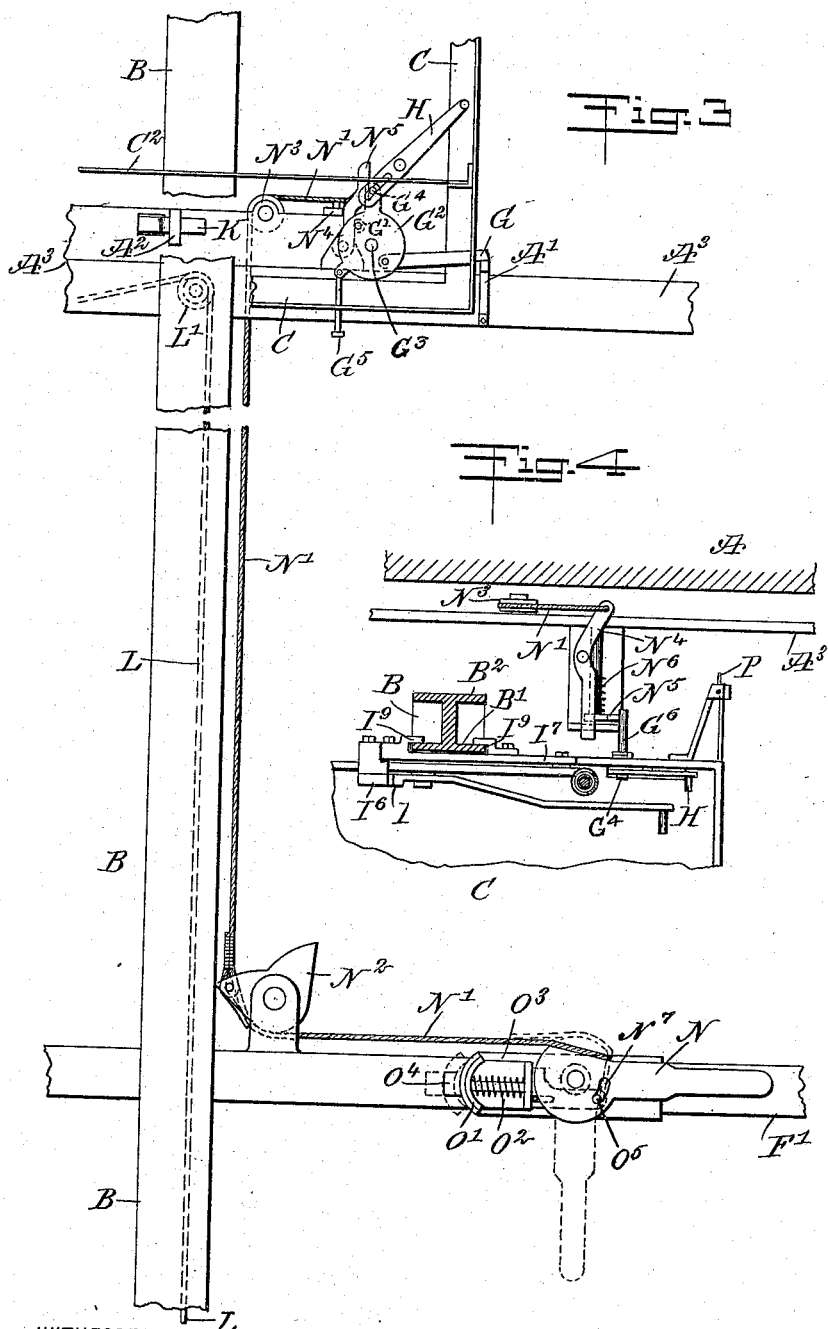

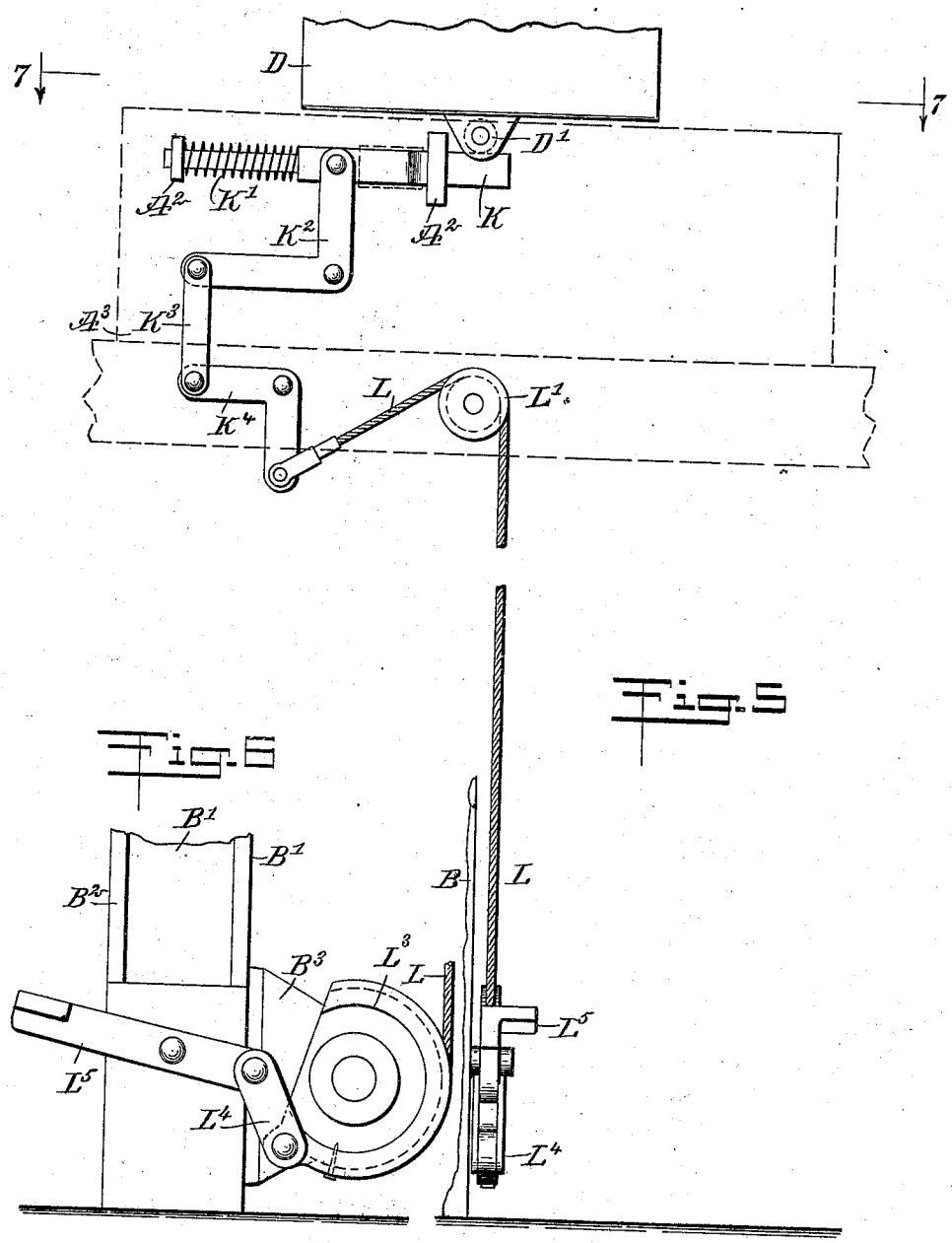

919,721.

Patented Apr. 27, 1909.
8 SHEETS—SHEET 5.

WITNESSES
F. D. Sweet.

INVENTOR
Joseph Hegedus
BY
ATTORNEYS

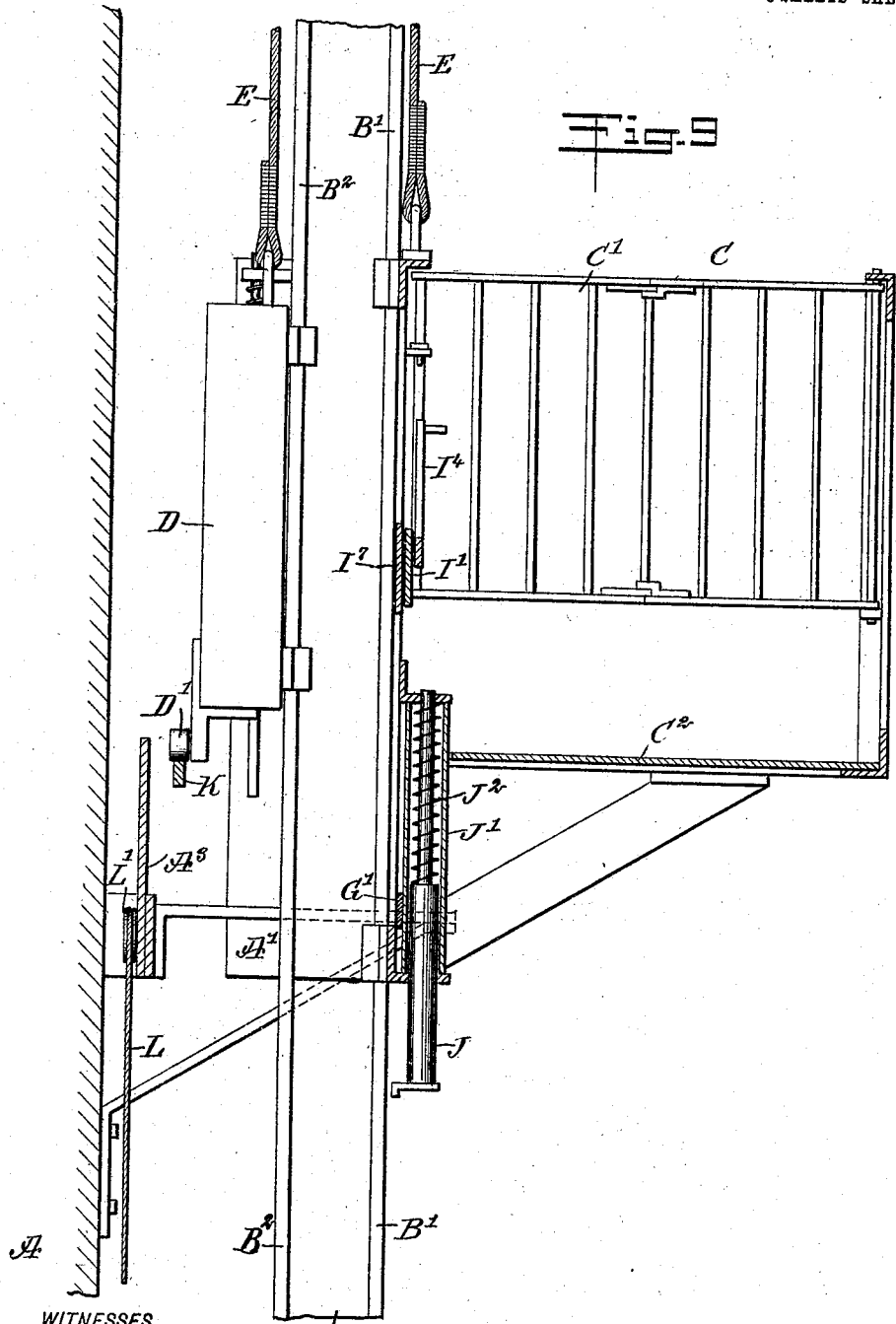

J. HEGEDUS.
FIRE ESCAPE.
APPLICATION FILED OCT. 4, 1907.
919,721.
Patented Apr. 27, 1909.
8 SHEETS—SHEET 7.
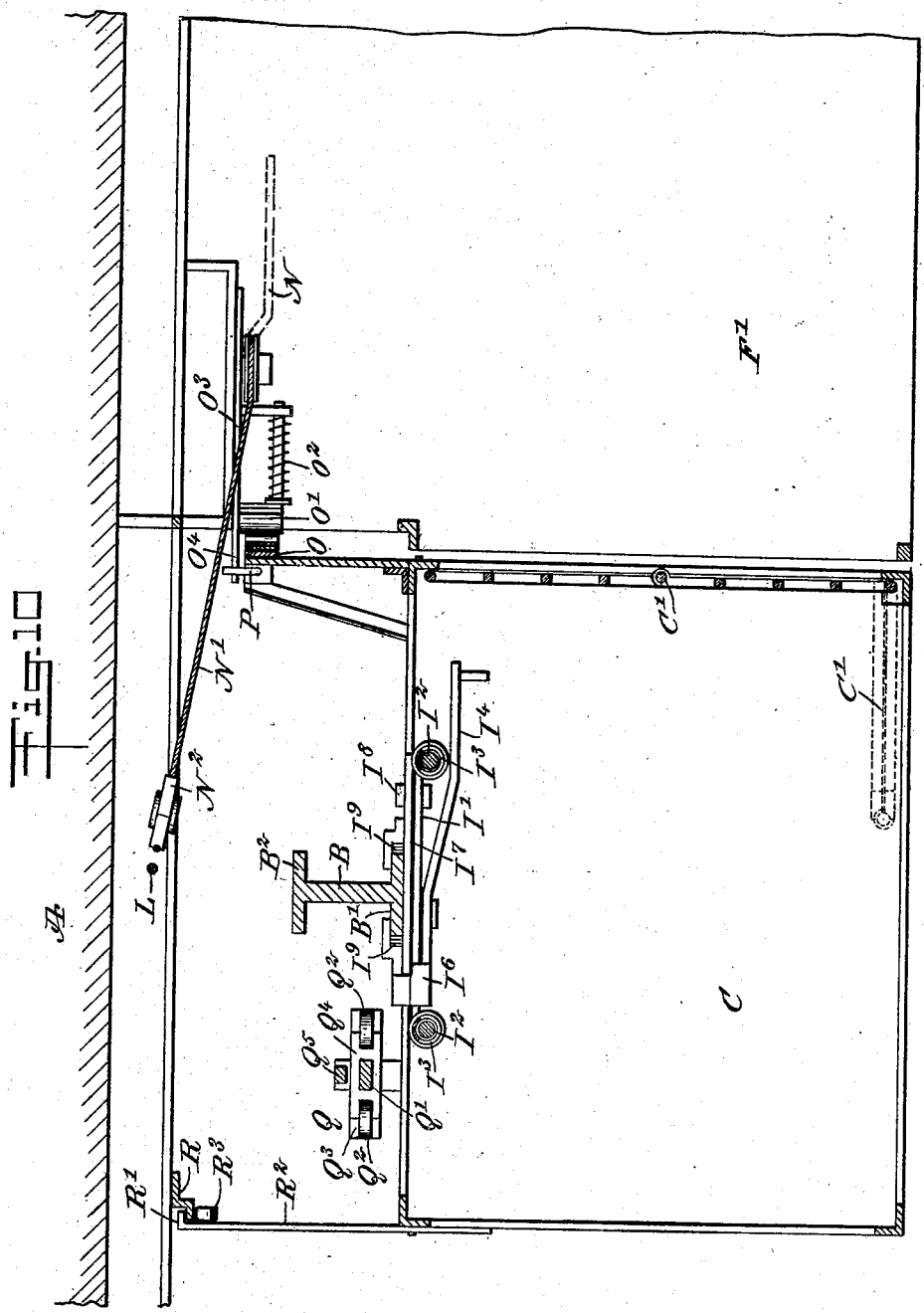
WITNESSES
INVENTOR
Joseph Hegedus
BY
ATTORNEYS

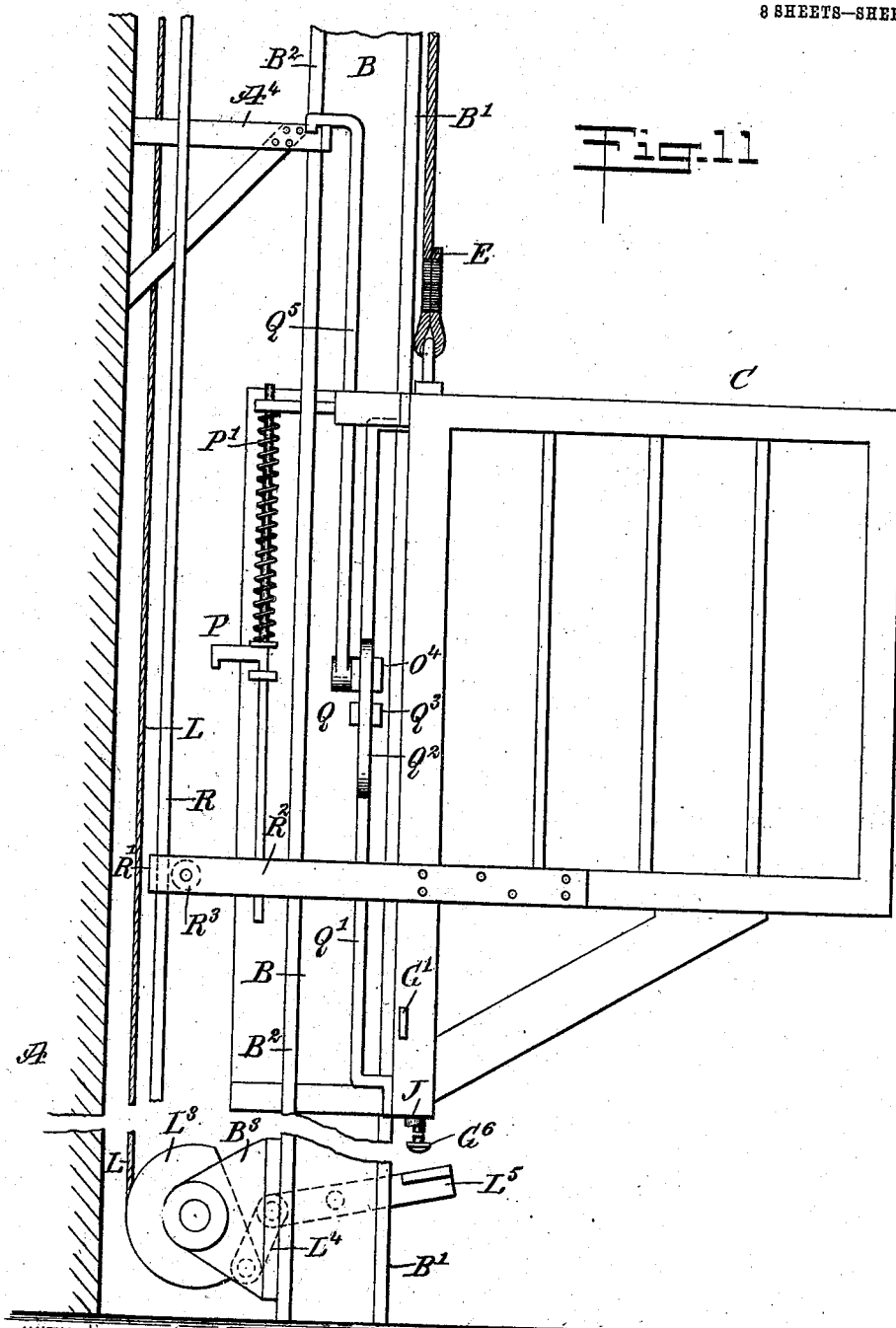

UNITED STATES PATENT OFFICE.

JOSEPH HEGEDUS, OF NEW YORK, N. Y.

FIRE-ESCAPE.

No. 919,721.            Specification of Letters Patent.           Patented April 27, 1909.

Application filed October 4, 1907. Serial No. 395,889.

*To all whom it may concern:*

Be it known that I, JOSEPH HEGEDUS, a subject of the King of Hungary, and a resident of the city of New York, borough of Brooklyn, in the county of Kings and State of New York, have invented a new and Improved Fire-Escape, of which the following is a full, clear, and exact description.

The object of the invention is to provide a new and improved fire escape for permanent use on buildings, and arranged to allow of repeatedly using the device for conducting people from any one of the floors of the building safely to the ground, and to permit the use of the device by firemen or other persons, for ascending to any one of the floors.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 7:
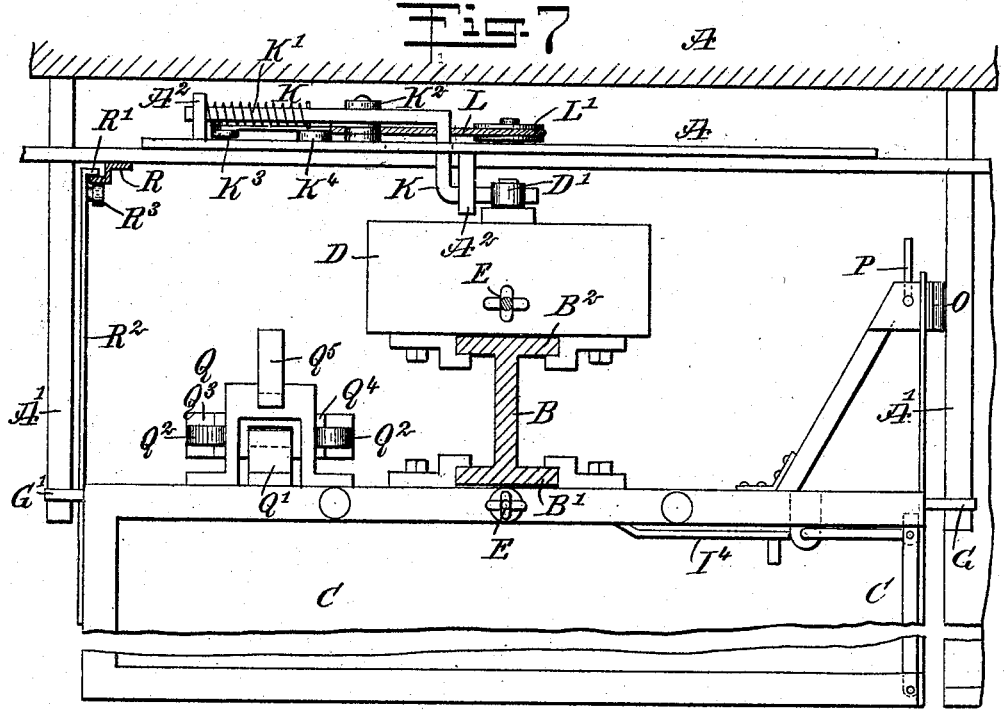
Figure 8:
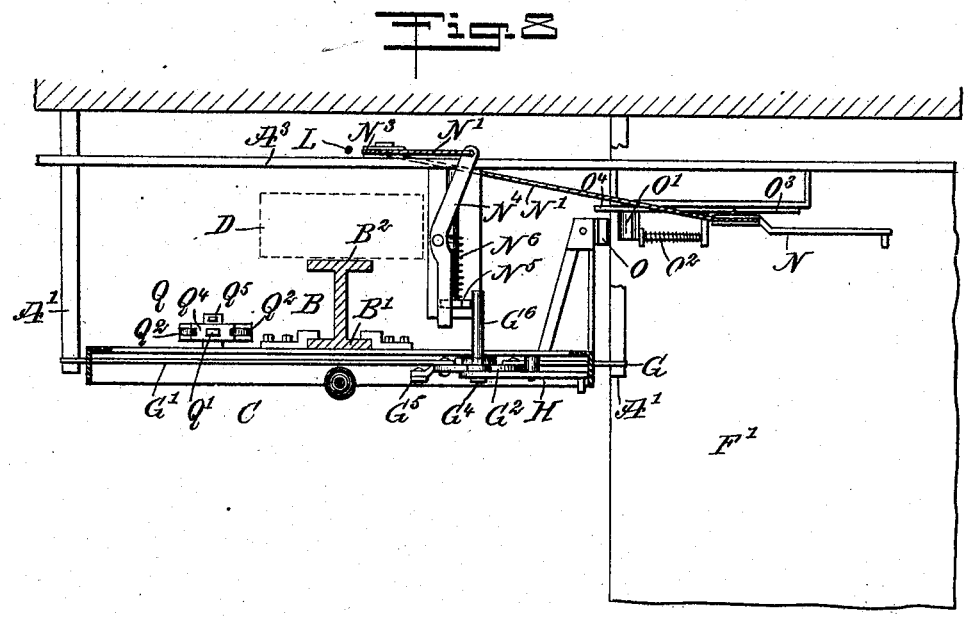

Figure 1 is a front elevation of the improvement as applied; Fig. 2 is an enlarged sectional front elevation of the cage in a position of rest; Fig. 3 is an enlarged front elevation of the improvement, showing more particularly the releasing device for releasing the cage from one of the floors below the top floor; Fig. 4 is a plan view of the same, the guideway and the building being shown in section; Fig. 5 is an enlarged rear elevation of the locking and releasing device for the counter-weight; Fig. 6 is a side elevation of the lower portion of the releasing device for the counter-balancing weight; Fig. 7 is an enlarged sectional plan view of the improvement on the line 7—7 of Fig. 5; Fig. 8 is a sectional plan view of the improvement on the line 7—7 of Fig. 5; Fig. 8 is a sectional plan view of the lower part of the cage on the line 8—8 of Fig. 2, and showing more particularly the device for releasing the cage from a floor below the top floor; Fig. 9 is a transverse section of the improvement on the line 9—9 of Fig. 2; Fig. 10 is a sectional plan view of the improvement on the line 10—10 of Fig. 2, and showing more particularly the cage lowered to and supported on any floor of the building; and Fig. 11 is an enlarged side elevation of the improvement showing the releasing device for the counter-balancing weights and the cage in position near the ground and the speed-device of the cage in action.

On the outside of the building A and spaced from the same is erected a guideway B, preferably in the form of a channel iron, to accommodate on its front member B' a cage C, and at its rear member B² a counter-balancing weight D, connected by a chain, cable or other flexible connection E with the said cage C, the said flexible connection E passing over a pulley E' journaled at or near the upper end of the guideway B (see Fig. 1). The cage C and the weight D are mounted to slide up and down on the members B', B² of the guideway B, but are normally locked in an uppermost position of rest, as shown in Fig. 1, the cage C then being adjacent to the uppermost balcony F, arranged on the top floor of the building A, similar balconies F', F² being located at the next floors below, with the exception of the ground floor, as persons living on this floor can readily escape in case of a fire without the use of a fire escape. The flexible connection E is of such a length as to be taut when the cage C is in a lowermost position and the weight D is in an uppermost position or vice versa, the flexible connection E, however, being slack when both the cage C and the counter-balancing weight D are locked in an uppermost position, the slack portion of the flexible connection then being preferably folded in the cage C. The cage C is open at the top and provided at the end adjacent to the ends of the balconies F, F', F² with a sectional or folding gate C', to permit ready ingress and egress of persons at a balcony or on the ground, it being understood that the cage C when unlocked is free to descend by its own weight on the guideway B, but means are provided to stop the cage at any one of the balconies, as hereinafter more fully explained. The cage C is normally supported in an uppermost position by the use of arms G and G', mounted to slide on the lower portion of the cage C, and adapted to rest at their outer ends on brackets A' fastened to the building A (see Figs. 1, 2 and 3). The inner ends of the supporting arms G, G' are pivotally connected with a crank G² fulcrumed at G³ on the cage C and provided with a pin G⁴, projecting from the front thereof and engaging an elongated slot H' of a lever H, fulcrumed at H² on the cage C, and projecting above the floor C² thereof, to be within convenient reach of a person passing into the cage C. Thus when the cage C is locked in an uppermost position and it is desired to descend, the person stepping from the balcony F into the cage C can manipulate the lever H, by swinging the same over, so that a turning motion is given to the crank G², whereby the supporting arms G, G' are caused to slide inward and are thus withdrawn from the brackets A'. The cage C is now free to descend, the downward movement of the cage being controlled by the operator manipulating a brake mechanism I, arranged on the cage and operating in conjunction with the front member B' of the guideway B.

The brake mechanism I is constructed as follows: The frame I' is mounted to slide up and down on guide rods I², arranged in the cage C, the frame I' being normally held in a lowermost position by springs I³ coiled on the rods I² (see Fig. 2). On the frame I' is fulcrumed a hand lever I⁴, provided at its weight end with gear teeth I⁵ in mesh with a segmental gear rack I⁶, secured on a brake lever I⁷, fulcrumed at I⁸ on the frame I⁹, the brake lever having brake shoes I⁹ (see Fig. 10), for engaging the side edges of the front member B' of the guideway B. Normally the brake shoes I⁹ loosely engage the member B' of the guideway B, but when a person bears down on the lever I⁴, then an upward swinging motion is given to the brake lever I⁷ to cause the brake shoes I⁹ thereof, to bind firmly on the side edges of the member B', to brake the cage C in its descent, it being understood that by having the brake mechanism arranged on the mounted frame I', the latter is free to yield in case the lever I⁴ is swung down too suddenly or forcibly, thus avoiding undue shock or jar to the occupants of the cage C.

In order to insure easy stopping of the cage C on reaching the ground, the cage is provided at its bottom with a plunger J, mounted to slide in a casing J' attached to the cage C, the plunger J being pressed on by a spring J² (see Fig. 9), to normally hold the lower end of the plunger J a distance below the bottom of the cage; thus when the cage C nears the ground, the plunger J comes in contact with the ground or a bracket on the guideway B, so that the spring J² is compressed, and thus the cage is cushioned to relieve the same of undue shock when moving into a lowermost position. When the cage C reaches the ground, the occupants of the cage can leave the same by way of the gate C⁷. The cage on moving into a lowermost position automatically releases the counter-balancing weight D, so that the weight is free to descend, and in doing so draws up the empty cage C.

The locking and releasing device for the counter-balancing weight D is arranged as follows, special reference being had to Figs. 5, 6, 7, 9 and 11. On the under side of the weight D is journaled an antifriction roller D', resting on a horizontally disposed bolt K, mounted to slide in suitable bearings A², arranged on a bracket A³, attached to the building A, the bolt K being normally held in an innermost position by a spring K', so that the bolt K normally supports the weight D. The bolt K is pivotally connected with a bell crank lever K², fulcrumed on the bracket A³, and pivotally connected by a link K³ with another bell crank lever K⁴, connected with one end of a rope or chain L, extending over a pulley L', journaled on the bracket A³. The rope L extends down to near the ground and connects at its lower end with the rim of a pulley L³ journaled on a bracket B³ attached to the lower end of the guideway B (see Fig. 6), and the pulley L³ is pivotally connected by a link L⁴ with a lever L⁵, fulcrumed on the end of the guideway B, and adapted to be engaged at its free end by a rod G⁵ (see Fig. 2), pivotally connected with the crank G², mounted in the cage C, as previously described. Now when the cage C reaches the lowermost position the rod G⁵ engages the lever L⁵ and imparts a swinging motion to the same, so that the link L⁴ turns the pulley L³, which latter thus draws on the rope L², and consequently a swinging motion is given to the bell crank lever K⁴, which by the link K³ imparts a swinging motion to the bell crank lever K², and the latter thus withdraws the bolt K from under the friction roller D', to release the weight D and to permit the same to drop. The weight D in dropping draws up the empty cage C to the top floor, so that other persons at the balcony F can now enter the cage C. Now the cage and its load over-balances the weight D, so that the cage again descends to the ground, the speed of the cage during the descent being controlled by the brake mechanism I, as before explained. The cage, on reaching the ground and after discharging the load again, returns to an uppermost position, to be used over and over again. The operator in charge of the brake mechanism I can apply the latter sufficiently hard to stop the cage C at any one of the lower balconies F' and F², both on the descent and ascent of the cage, to allow persons to reach the ground in safety from any one of the floors of the building.

When the cage C and the weight D are in their normal locked positions at the top floor of the building, and a person on one of the balconies F' or F² desires to make use of the cage to descend to the ground, a mechanism is provided, controlled by the person on the balcony F' or F², to release the cage and to bring the same automatically to a stop at the particular balcony. This mechanism is arranged as follows, special reference being had to Figs. 1, 3, 4, 8, 10 and 11: On each of the balconies F' and F² is fulcrumed a cam lever N, connected with one end of a rope or chain N', extending over guide pulleys $N^2$, $N^3$, of which the guide pulley $N^2$ is journaled on the balcony $F^7$ (or $F^2$) and the pulley $N^3$ is journaled on the bracket $A^3$ at the upper floor of the building A. The upper end of the rope or chain N' connects with a transversely extending lever $N^4$, engaging a vertical lever $N^5$, pressed on by a spring $N^6$, and engaging a transversely extending pin $G^6$, attached to the crank $G^2$, employed for withdrawing the supporting arms G and G', as previously explained. The pin $G^6$ projects from the back of the crank $G^2$ and may practically be a continuation of the pin $G^4$. Now when the operator swings the cam lever N downward into the position shown in dotted lines in Fig. 3, then a pull is exerted by the said lever N on the rope or chain N', which imparts a swinging motion to the lever $N^4$, which in turn imparts a swinging motion to the lever $N^5$, and the latter by engaging the pin $G^6$ imparts a turning motion to the crank $G^2$, whereby the supporting arms G and G' are withdrawn from the bracket A', to release the cage C. The latter now descends and when it nears the balcony F' or $F^2$, it is gradually braked and finally brought to a standstill at the balcony, to allow persons to pass from the balcony into the cage. Now in order to brake the cage C in its descent to the balcony referred to, one side of the cage is provided with a sinuous band O, adapted to engage a brake shoe O', pressed on by a spring $O^2$ and mounted to slide on an arm $O^3$, controlled by the cam lever N, and having a projection $O^4$ adapted to pass into the path of a spring-pressed supporting arm P, mounted on the rear part of the cage C (see Fig. 10). The stop arm $O^3$ is mounted to slide longitudinally on the balcony F' (or $F^3$) and is provided with a pin $O^5$ engaging a slot $N^7$ on the cam lever N, (see Fig. 3) so that when the latter is swung downward, the stop arm $O^3$ is shifted to the left, to bring the projection $O^4$ into the path of the supporting arm P on the cage C, to stop the latter on reaching the balcony F' (or $F^2$).

An automatic safety brake mechanism is arranged in the cage C, to brake the latter when nearing a lowermost position, to avoid undue shock to the occupants of the cage C, especially when a large number of persons occupy the cage and the brake mechanism I and the plunger J would not be sufficient. This brake mechanism Q is arranged as follows, special reference being had to Figs. 2, 7, 8, 10 and 11: On the rear of the cage C is secured a vertically extending bar Q', engaged at opposite sides by brake levers $Q^2$, fulcrumed on a slide $Q^3$, mounted to slide on the bar Q'. The free inwardly curved upper ends of the brake levers $Q^2$ are engaged by an actuating bar $Q^4$ slidably mounted on the bar Q' and connected with a hook $Q^5$, adapted to hook onto a bracket $A^4$, attached to the building a distance above the ground (see Fig. 11). Now when the cage in its descent nears the ground, the hook $Q^5$ engages the bracket $A^4$, thus holding the bar $Q^4$ stationary, and causing the bar $Q^4$ to swing the upper ends of the brake levers $Q^2$ outward and the lower ends thereof into firm engagement with the bar Q' fixed on the descending cage. The brake levers $Q^2$ press firmly on the bar Q' and slide thereon, to gradually bring the cage to a stop, that is, before the bar $Q^4$ has reached the upper end of the guide bar Q'. In order to steady the cage C in its ascent and descent, an additional guide R, parallel to the guide B, is secured on the building A, and is engaged on one side by a lug R', held on a transverse bar $R^2$, attached to the cage C, the other side of the guide R being engaged by an antifriction roller $R^3$ (see Figs. 7, 10 and 11).

The operation is as follows: When the cage C and the weight D are locked in their normal uppermost positions, as shown in Fig. 1, and a fire breaks out in the building A, then persons on the balcony F can readily pass into the cage C on opening the folding gate C', and then one of the persons passing into the cage C, on manipulating the lever H, as previously described, releases the cage C, so that the latter descends, the speed of the cage being controlled by the operator manipulating the lever $I^4$ of the brake mechanism I. When the cage C with its load nears the ground, then the brake mechanism Q reduces the speed of the cage, to practically bring the cage to a standstill at the time the cage reaches the ground, the cage being cushioned by the spring-pressed plunger J. Now when the cage C reaches the ground, the rod $G^5$ acts on the lever $L^5$, to cause the withdrawal of the bolt K, to unlock the weight D, so that the empty cage C is over-balanced and is drawn upward by the descent of the weight D. The weight D is preferably made sufficiently heavy so as to over-balance the cage C and one operator, for manipulating the lever $I^4$ during the subsequent ascent and descent of the cage, it being understood that in this manner the cage can be stopped at any one of the balconies to take on persons and to safely carry the same to the ground.

In case the cage C and the weight D are locked in an uppermost position and persons from an intermediate balcony F' or $F^2$ desire to make use of the cage, then the lever N on the respective balcony F' or $F^2$ is actuated, as above described, to unlock the cage C and to allow the same to descend, it being understood that by the operator manipulating the lever N, the brake shoe O' is moved to the left, to engage the brake bar O, with a view to check the speed of the descending cage. At the same time the projection $O^4$ of the arm $O^3$ actuated by the lever N is moved into the path of the supporting arm P, and when the cage C arrives at the balcony, the supporting arm P engages the projection $O^4$, to bring the cage to a full stop. Thus the cage C can be lowered to any one of the balconies to take on persons, after which the cage proceeds on its downward journey to carry the people to the ground. As previously mentioned, the cage C when reaching a lowermost position unlocks the weight D, so that the cage is free to ascend, to permit using the cage by persons on any one of the balconies, as above explained. It is understood that the weight D may be so proportioned as to lift the cage together with one or more persons, such as firemen, to allow the same to ascend to any one of the floors for assisting in the rescue of the persons in the building, as well as to carry the men to any one of the floors for extinguishing the fire within the building.

Having thus described my invention, I claim as new and desire to secure by Letters Patent:

1. A fire escape for buildings, comprising a guideway permanent on the building, a cage mounted to slide up and down on the guideway, manually controlled means for manually locking the cage in an uppermost position on the uppermost floor of the building and for releasing the cage by an occupant of the cage, a brake mechanism on the cage for engagement with the said guideway and under the control of an occupant of the cage to control the descent of the cage after being unlocked, a counter-weight normally locked in an uppermost position on the guideway, and unlocking means controlled by the cage on the latter reaching a lowermost position.

2. A fire escape for buildings, comprising a cage adapted to travel up and down on the building, a counter-balancing weight for the said cage and adapted to travel up and down on the building, and means for normally locking the said weight in an uppermost position and controlled by the said cage on the latter reaching a lowermost position for the said weight to return the cage to an uppermost position.

3. A fire escape for buildings, comprising a cage adapted for travel up and down on the building, a counter-balancing weight, a pulley, a flexible connection passing over the said pulley and connecting the said weight with the said cage, the flexible connection being normally folded in the cage, and means for normally locking the said weight in an uppermost position and controlled by the said cage on the latter reaching a lowermost position, for the said weight to pull the cage up.

4. A fire escape for buildings, comprising a cage mounted to travel up and down on the building, a locking device for normally locking the cage in position on the top floor of the building, releasing devices on the several intermediate floors below the said top floors for releasing the cage from any one of the floors, stopping devices on the said intermediate floors and operating in conjunction with the said releasing devices to arrest the cage on the particular floor, a manually controlled device on the cage for disengaging the cage from the said stopping devices to allow the cage to descend, a counter-balancing weight normally locked in an uppermost position on the guideway, and unlocking means controlled by the cage on the latter reaching a lowermost position.

5. A fire escape for buildings, comprising a guideway on the building, a cage mounted to slide on the said guideway, supporting brackets on the building at the top floor, and arranged at opposite sides of the guideway, sliding arms on the cage, the outer ends of said arms being adapted to rest on the said brackets for supporting the cage normally in an uppermost position, a crank mounted to turn in the said cage and provided with a pin projecting from the front thereof the inner ends of the said arms being pivotally connected with the said crank, a hand lever fulcrumed on the said cage and having a slot engaged by the pin on said crank for turning the latter, to withdraw the sliding arms from the said brackets, a rearwardly extending pin on said crank, releasing devices on floors below the top floor, and connections between the said releasing devices and the rearwardly extending pin on said crank for turning the latter to release the cage from any one of the floors.

6. A fire escape for buildings, comprising a guideway on the building, a cage mounted to slide on the said guideway, supporting brackets on the building at the top floor, sliding arms on the cage adapted to rest on the said brackets for supporting the cage normally in an uppermost position, and means for moving the said arms to release the cage, the said means comprising a crank mounted to turn in the said cage, and connected with the said sliding arms, an arm mounted to swing and adapted to engage a projection on the crank to turn the latter, a lever fulcrumed on the building for engaging and moving the said arm and a manually controlled device on the building and extending from an intermediate floor to the top floor for actuating the said lever.

7. A fire escape for buildings, comprising a guideway on the building, a cage mounted to slide on the said guideway, supporting brackets on the building at the top floor, sliding arms on the cage adapted to rest on the said brackets for supporting the cage normally in an uppermost position, a crank mounted to turn in the said cage and connected with the said sliding arms, a rearwardly extending pin on the said crank, an arm pivoted on the building for engaging the said pin, a lever fulcrumed on the building for engaging the said pivoted arm, a cable connected with the lever, guide pulleys on the building and over which passes the said cable, and a manually controlled device on a lower floor and connected with the said cable for exerting a pull thereon to release the cage.

8. A fire escape for buildings, comprising a guideway on the building, a cage mounted to slide on the said guideway, supporting brackets on the building at the top floor, sliding arms on the cage adapted to rest on the said brackets for supporting the cage normally in an uppermost position, a crank mounted to turn in the said cage and connected with the said sliding arms, a rearwardly extending pin on the said crank, an arm pivoted on the building for engaging the said pin, a lever fulcrumed on the building for engaging the said pivoted arm, a cable connected with the lever, guide pulleys on the building and over which passes the said cable, a cam lever fulcrumed at a lower floor and on which the said cable is secured, and a spring-pressed brake shoe controlled by the said cam lever and adapted to engage one side of the descending cage to bring the same to a stop.

9. A fire escape for buildings, comprising a guideway on the building, a cage mounted to slide on the said guideway, supporting brackets on the building at the top floor, sliding arms on the cage adapted to rest on the said brackets for supporting the cage normally in an uppermost position, a crank mounted to turn in the said cage and connected with the said sliding arms, a rearwardly extending pin on the said crank, an arm pivoted on the building for engaging the said pin, a lever fulcrumed on the building for engaging the said pivoted arm, a cable connected with the lever, guide pulleys on the buildings and over which passes the said cable, a cam lever fulcrumed at a lower floor of the building and on which the lower end of the said cable is secured, a sinuous brake plate held on the cage, and a brake shoe controlled by the said cam lever for engaging the said brake plate.

10. A fire escape for buildings, comprising a guideway on the building, a cage mounted to slide on the said guideway, supporting brackets on the building at the top floor, sliding arms on the cage adapted to rest on the said brackets for supporting the cage normally in an uppermost position, a crank mounted to turn in the said cage and connected with the said sliding arms, a rearwardly extending pin on the said crank, an arm pivoted on the building for engaging the said pin, a lever fulcrumed on the building for engaging the said pivoted arm, a cable connected with the lever, guide pulleys on the building and over which passes the said cable, a cam lever fulcrumed at a lower floor of the building and on which the lower end of the said cable is secured, a sinuous brake plate held on the cage, a brake shoe controlled by the said cam lever for engaging the said brake plate, a lug on the said brake shoe, and a spring-pressed supporting arm on the cage for engagement with the said brake shoe lug to hold the cage in position.

11. A fire escape for buildings, comprising a guideway fixed on the building, a cage slidable on the guideway, a counterbalancing weight for the said cage and slidable on the guideway, a flexible connection between the cage and the weight, a locking bolt for normally locking the weight in place in an uppermost position, a lever adapted to be engaged by the cage on reaching a lowermost position, a pulley connected by a link with the said lever, a rope attached at its lower end to the said pulley, and a lever mechanism connected with the upper end of the said rope and with the said bolt, for withdrawing the latter and releasing the weight.

12. A fire escape for buildings, comprising a guideway on the building, a cage slidable freely on the said guideway, and a safety device having a brake bar fixed on the cage, brake shoes for engaging the said brake bar and mounted to slide thereon, an actuating arm mounted to slide on the said brake bar for actuating the said brake shoes, a hook on the said actuating arm, and a bracket on the lower portion of the building for engagement by the said hook, to impart an upward movement to the actuating arm to apply the brake shoes at the time the cage nears its lowermost position.

13. A safety device for cages mounted to travel downward, comprising a brake bar on the cage, a brake shoe movable on the cage for engaging the brake bar, a hook for operating the said brake shoe, and a fixed bracket external of the cage and adapted to be engaged by the said hook at the time the cage nears its lowermost position.

14. A fire escape for buildings, comprising a guideway fixed on the building, a cage slidable on the said guideway, a brake shoe lever having brake shoes for engaging the said guideway, a gear segment on the said brake shoe lever, and a toothed lever in mesh with the said segment.

15. A fire escape for buildings, comprising a guideway fixed on the building, a cage slidable on the said guideway, a brake shoe lever having brake shoes for engaging the said guideway, a gear segment on the said brake shoe lever, a toothed lever in mesh with the said segment, and a spring-pressed slide on the cage and in which the said brake shoe lever and the said toothed lever are fulcrumed.

16. A fire escape for buildings, comprising a guide way permanent on the building, a cage mounted to slide up and down on the guideway, manually controlled means for normally locking the cage in an uppermost position on the uppermost floor of the building and for releasing the cage by an occupant of the latter, guides arranged on the cage, a frame mounted to slide up and down on said guides, means for normally holding the frame in a lowermost position, a brake shoe lever fulcrumed on the frame and having brake shoes for engagement with the said guideway on the building, a gear segment on the brake shoe lever, and a toothed lever in mesh with the segment for actuating the brake shoe lever, the said toothed lever being under control of the occupant of the cage to control the descent of the cage after the latter is unlocked.

17. A fire escape for buildings comprising a guideway on the building, a cage mounted to slide up and down on the said guideway, a locking device for normally locking the cage in position on the top floor of the building, a cable, connections between the cable and the locking device for unlocking the latter when the cable is pulled, manually controlled releasing devices on floors below the top floor and connected with said cable for releasing the cage from any one of the floors, a spring pressed supporting arm mounted on the cage, and stop arms mounted to slide and each having a projection adapted to pass into the path of the said supporting arm, the said stop arms being controlled by the releasing devices, to arrest the cage on the particular floor.

18. A fire escape for buildings, comprising a guideway on the building, a cage mounted to slide up and down on the said guideway, a locking device for normally locking the cage in position on the top floor of the building, releasing devices on floors below the top floor for releasing the cage from any one of the floors, a brake plate held on the cage, and brake shoes, each controlled by one of said releasing devices for engaging the said brake plate.

19. A fire escape for buildings, comprising a cage mounted to travel up and down on the building, a locking device for normally locking the cage in position on the top floor of the building, releasing devices on the several floors below the top floor, connections between the said releasing devices and the locking device for unlocking the latter from any one of the said floors, a supporting arm carried by the cage, stop arms mounted to slide and adapted to pass into the path of the said supporting arm, the said stop arms being controlled by the said releasing devices to arrest the cage at the particular floor, and and brake mechanisms for the cage each controlled by one of said releasing devices.

20. A fire escape for buildings, comprising a guideway on the building, a cage mounted to slide up and down on the said guideway, manually controlled means for normally locking the cage in position at the top floor of the building and for releasing the cage by an occupant of the latter, a brake mechanism under the control of the occupant of the cage for controlling the descent of the cage after the latter is unlocked, releasing devices on the several floors below the top floor, connections between the said releasing devices and the locking device, for unlocking the latter from any one of said floors, a supporting arm carried by the cage, and stop devices controlled by the releasing devices and adapted to extend into the path of the said supporting arm.

In testimony whereof I have signed my name to this specification in the presence of two subscribing witnesses.

JOSEPH HEGEDUS.

Witnesses:
A. J. NEUBAUER,
E. MICSAK.